(No Model.) 10 Sheets—Sheet 1.

A. LAING.
APPARATUS FOR VENTILATING STOKE HOLES, &c.

No. 346,755. Patented Aug. 3, 1886.

Witnesses
J. A. Rutherford
Robert Everett

Inventor,
Andrew Laing.
By James L. Norris.
Atty.

N. PETERS, Photo-Lithographer, Washington, D. C.

(No Model.) 10 Sheets—Sheet 3.

A. LAING.
APPARATUS FOR VENTILATING STOKE HOLES, &c.

No. 346,755. Patented Aug. 3, 1886.

Witnesses
J. A. Rutherford
Robert Everett

Inventor
Andrew Laing
By James L. Norris.
Atty.

(No Model.) 10 Sheets—Sheet 4.

A. LAING.
APPARATUS FOR VENTILATING STOKE HOLES, &c.

No. 346,755. Patented Aug. 3, 1886.

Witnesses.
J. A. Rutherford
Robert Everitt

Inventor
Andrew Laing.
By James L. Norris,
Atty.

(No Model.) 10 Sheets—Sheet 5.

A. LAING.
APPARATUS FOR VENTILATING STOKE HOLES, &c.

No. 346,755. Patented Aug. 3, 1886.

Witnesses
J. A. Rutherford
Robert Everett

Inventor
Andrew Laing
By James L. Norris,
Atty.

(No Model.) 10 Sheets—Sheet 6.
A. LAING.
APPARATUS FOR VENTILATING STOKE HOLES, &c.

No. 346,755. Patented Aug. 3, 1886.

Witnesses. Inventor.
Andrew Laing.
By James L. Norris.
Atty.

(No Model.) 10 Sheets—Sheet 9.
A. LAING.
APPARATUS FOR VENTILATING STOKE HOLES, &c.

No. 346,755. Patented Aug. 3, 1886.

Witnesses.

Inventor
Andrew Laing,
By James L. Norris.
Atty.

(No Model.) 10 Sheets—Sheet 10.
A. LAING.
APPARATUS FOR VENTILATING STOKE HOLES, &c.

No. 346,755. Patented Aug. 3, 1886.

Witnesses

Inventor
Andrew Laing.
By
James L. Norris.
Atty.

UNITED STATES PATENT OFFICE.

ANDREW LAING, OF GLASGOW, COUNTY OF LANARK, SCOTLAND.

APPARATUS FOR VENTILATING STOKE-HOLES, &c.

SPECIFICATION forming part of Letters Patent No. 346,755, dated August 3, 1886.

Application filed April 22, 1886. Serial No. 199,790. (No model.) Patented in England March 24, 1886, No. 4,161.

*To all whom it may concern:*

Be it known that I, ANDREW LAING, a subject of the Queen of Great Britain, residing at Glasgow, county of Lanark, Scotland, have invented a new and useful Apparatus for Ventilating Stoke-Holes and Supplying Boiler-Fires with Heated Air, (for which application for patent has been made in Great Britain, March 24, 1886, No. 4,161,) of which the following is a specification.

My invention relates to apparatus for ventilating stoke-holes by withdrawing the heated and foul air therefrom and supplying boiler-fires with air so withdrawn under pressure and further heated. As such provisions are more particularly required in steam-vessels, I will describe several modified forms of apparatus according to my invention suited to several types and arrangements of marine boilers, referring to the accompanying drawings, in which as far as possible, similar reference-numbers are employed to indicate corresponding parts.

Figs. 4 to 24, inclusive, are detail views showing modifications hereinafter fully explained.

Figure 1:
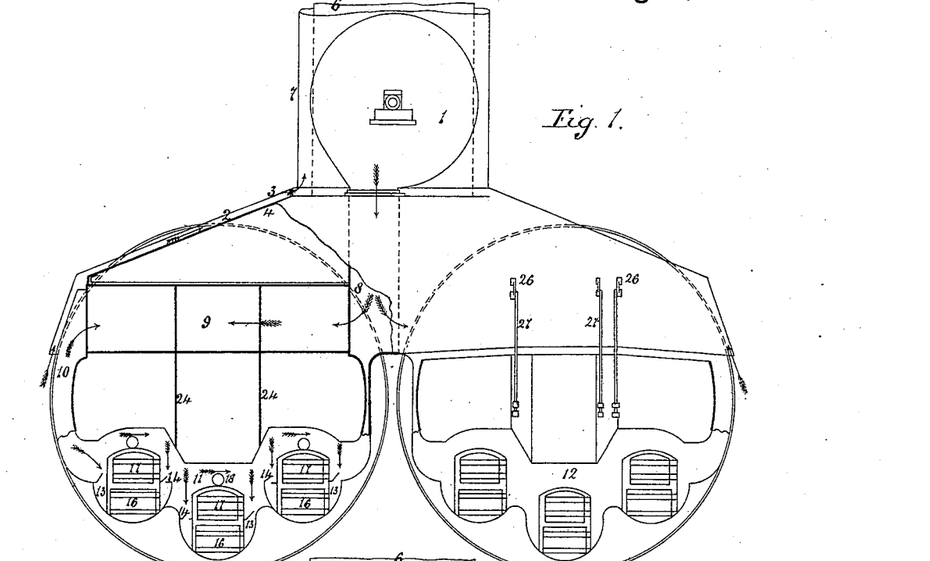
Figure 1 is a front sectional elevation showing apparatus according to my invention applied to two cylindrical boilers, which may be duplicated in length, as shown in longitudinal section by Fig. 2, or may be single in length, as shown in Fig. 3.
Figure 2:
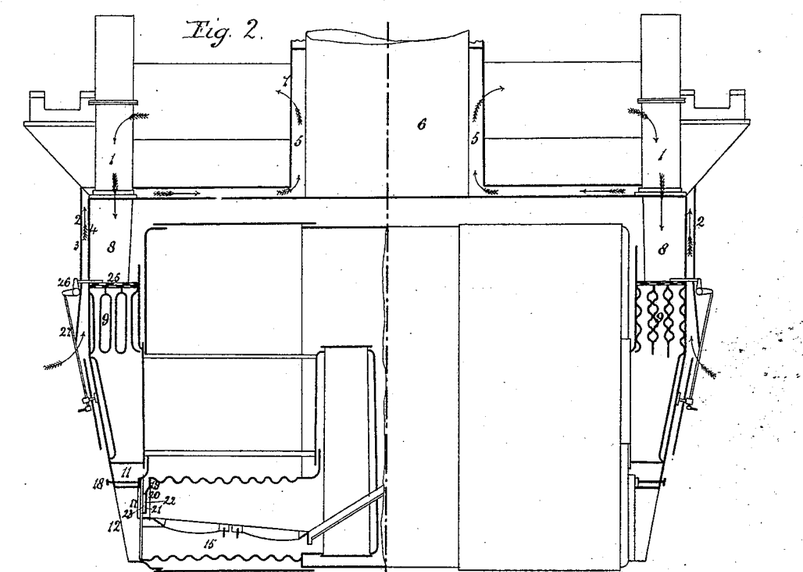
Figures 3, 6, 10, 11:
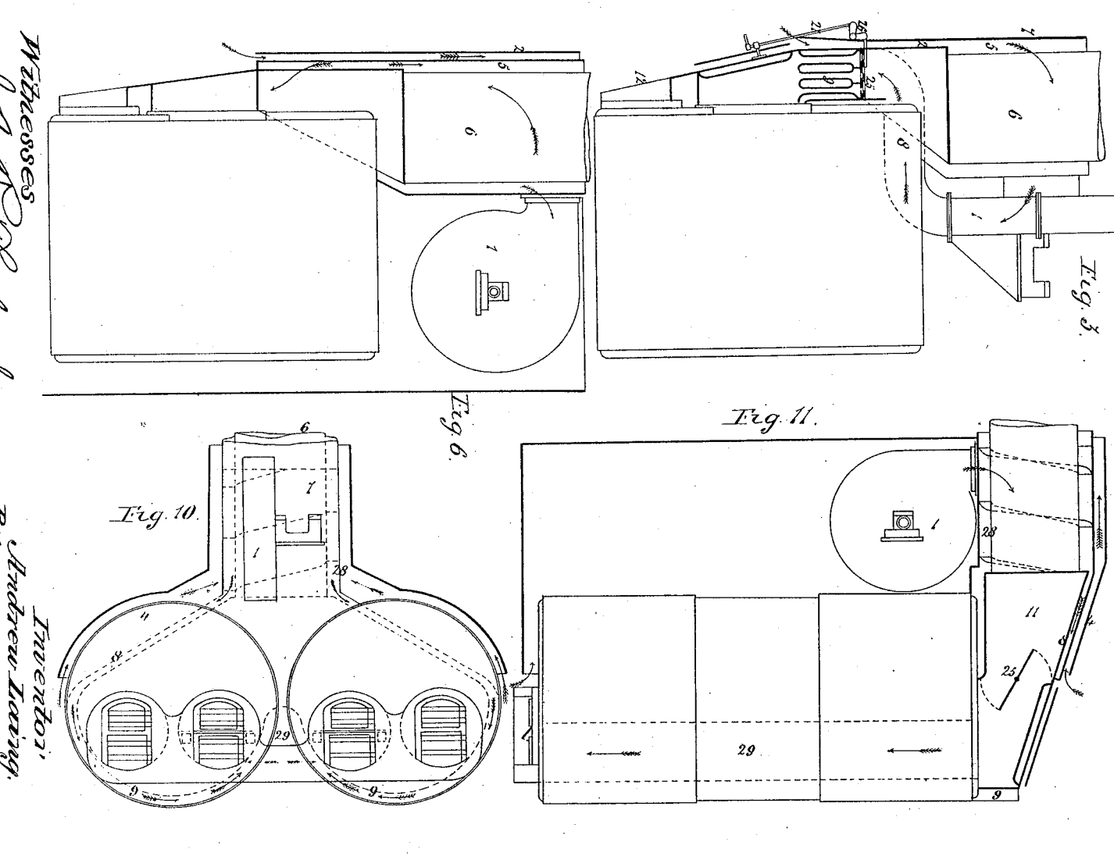

I will first describe the invention with reference to Figs. 1, 2, and 3. By means of a fan or pair of fans, 1, or other known exhausting and blowing apparatus the air is drawn from the stoke-hole along passages 2, formed between the uptake 3 and air-casing 4, then through an annular space, 5, between the funnel 6 and air-casing 7, where the air is somewhat heated. It is then driven by the fan through channels 8 and passages 9, that may be plain or corrugated, or may be tubes formed or arranged within the uptake, so that the air is further heated by the products of combustion on their way to the chimney. The heated air from 9 passes through a channel, 10, into a chamber, 11, formed under the smoke-box and between the face of the boilers and the furnace-front 12. From the chamber 11 the air is passed through openings 13 to the ash-pits 15 through doors 14, which can be adjusted to give each furnace the required supply. It is convenient to work the doors 14 by a system of levers with the ash-pit doors, so that these doors cannot be opened till the air-doors 14 are closed, the escape of heated air to the stoke-hole being thus prevented. Above the firing-doors 17 are valves 18, by which air can be admitted from the chamber 11 to the spaces 19 between the inner fronts, 20, and the air-plates 21, and also to the spaces 22, between the doors 17 and the air-plates 23, so that it can pass to the furnaces through the perforations in the plates 21 and 23. By leaving the valves 18 open while firing the influx of colder air from the stoke-hole to the furnace is prevented. The uptake may be divided by partitions 24 into separate ascending channels—one for each furnace—and each of those channels may be governed by a sliding valve or damper, 25, worked by a lever, 26, and rod 27, so that the draft of each furnace can be separately regulated. Instead of sliding valves throttle-valves 25 may be used, as shown in Figs. 5, 9, 11, 13, 15, and 17.

Figure 4:
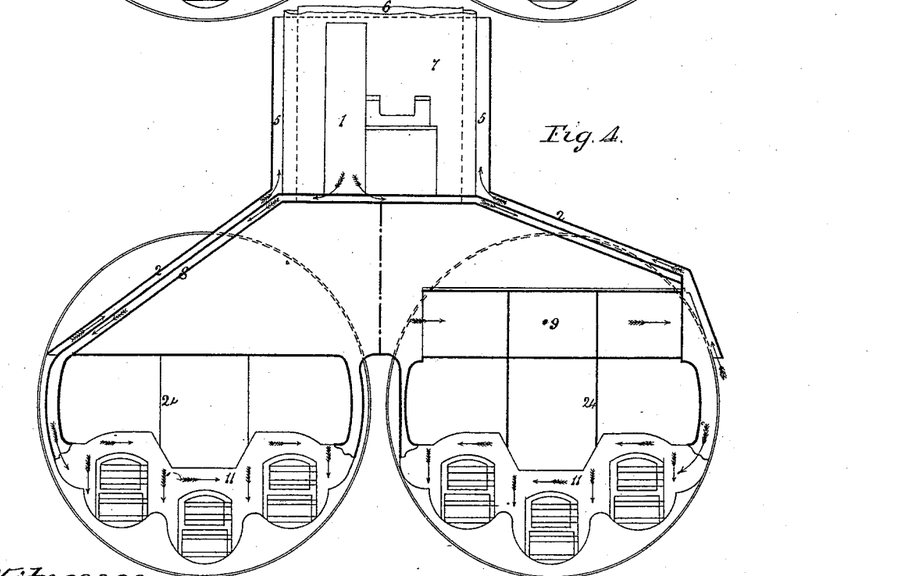
Figure 5:
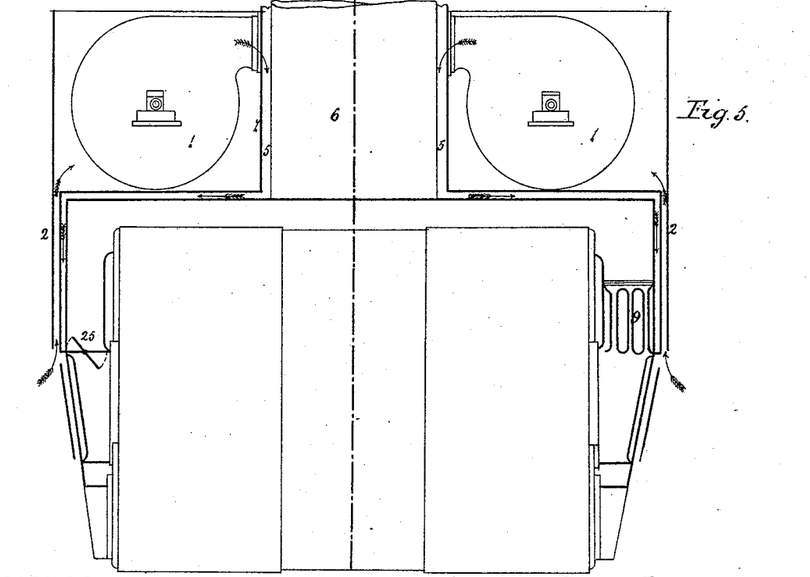

In the arrangement shown by Figs. 4, 5, and 6 the fan 1 draws the air by the passages 2 from the stoke-hole and from the space surrounding the chimney-casing, and drives it through the casing 5 either directly by the passage 8, as shown on the left side of Fig. 4, or through the heating-channels 9 in the uptake, as shown on the right side of Fig. 4, to the chamber 11, whence it passes to the furnace, as already described.

Figure 7:
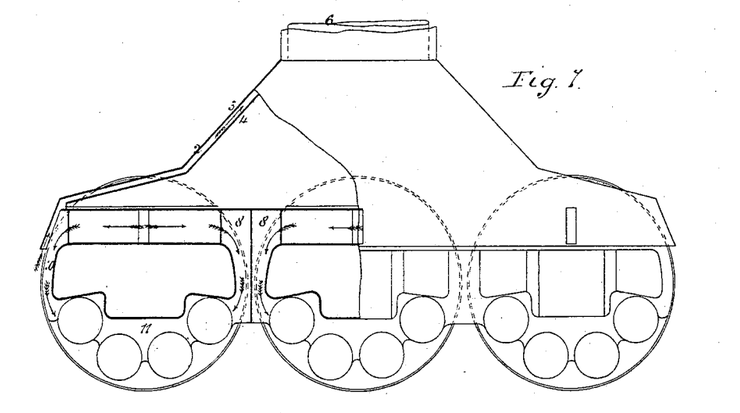
Figure 8:
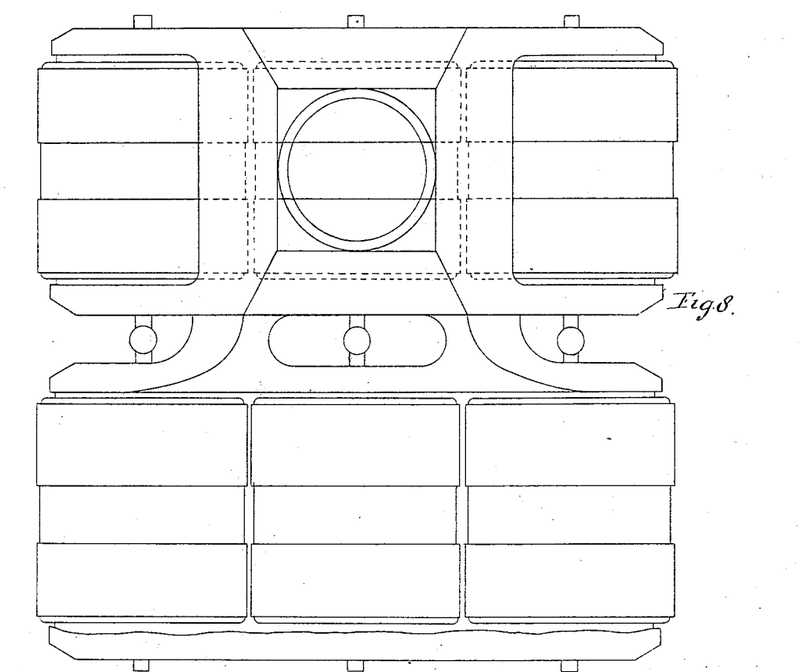
Figure 9:
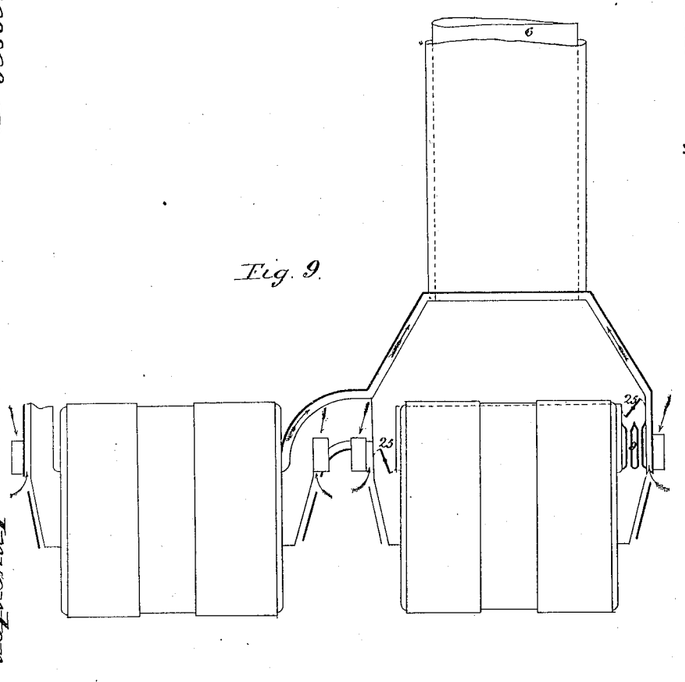

Figs. 7, 8, and 9 show an arrangement of the channel in cases where several boilers are grouped together.

Figs. 10 and 11 show an arrangement applicable to the low type of marine boiler. In this case the air is drawn from the stoke-hole, &c., by the fan 1, which drives it through a helical channel, 28, surrounding the funnel 6, and through space 8 between the uptake and the air-casing 4, along channels 9 under the front, and a central passage, 29, to the chamber 11, whence it passes to the furnaces in regulated quantity, as before described.

Figure 12:
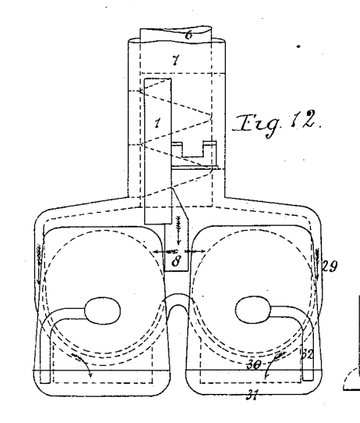
Figure 13:
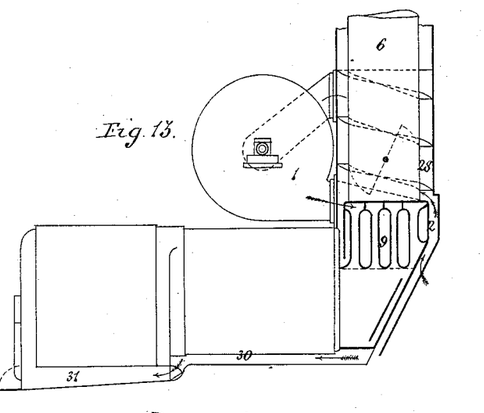
Figure 14:
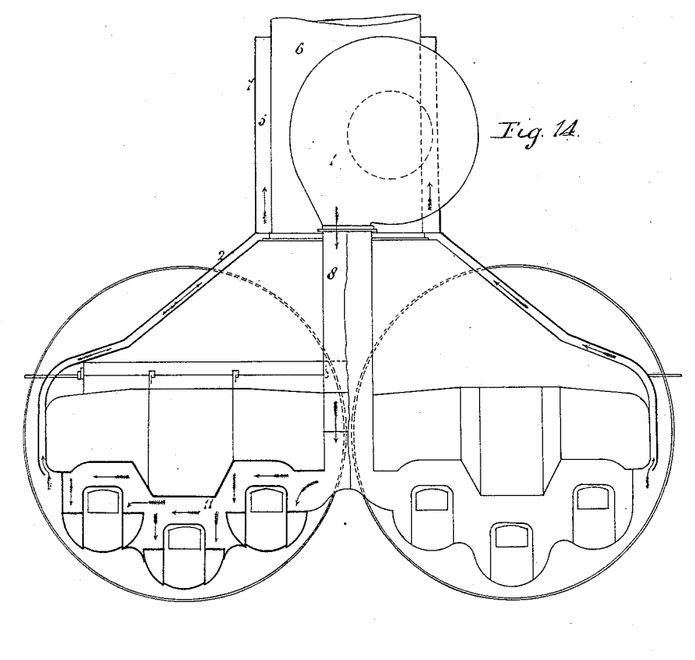
Figure 16:
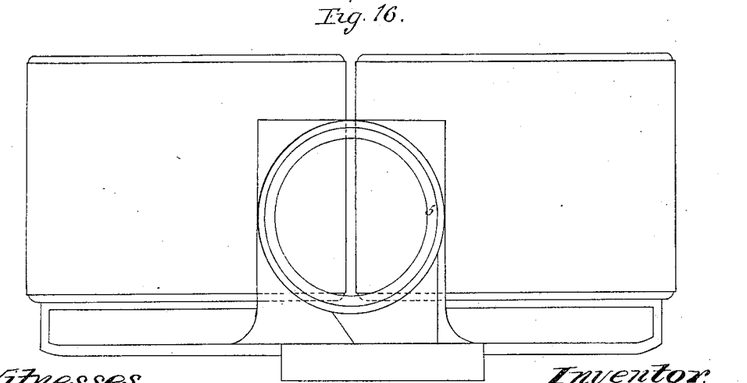

Figs. 12 and 13 show an arrangement similar to that shown by Figs. 10 and 11, modified to suit boilers of locomotive kind or such as are used in torpedo-boats. The air is drawn from the stoke-hole through the space 2 between the uptake and the air-casing 4, through the helical passage 28 to the fan 1, which drives it through passages 8, 9, 30, and 29 to the ash-pit 31. By a passage, 32, led up from 31, air can be admitted by the furnace-door. As in this arrangement the air-supply to the furnaces is not taken from a low level in the stoke-hole but passes along closed channels, steam can be kept up even when the stoke-hole is flooded, and should a tube give way the occupants of the stoke-hole are protected.

In the arrangement shown by Figs. 14, 15, 16, and 17, the air is drawn by the fan 1 from the stoke-hole through the space 2 and the funnel-casing 5, and driven through the passage 8 to the chamber 11, and thence to the furnaces.

Figures 18, 22, 23:
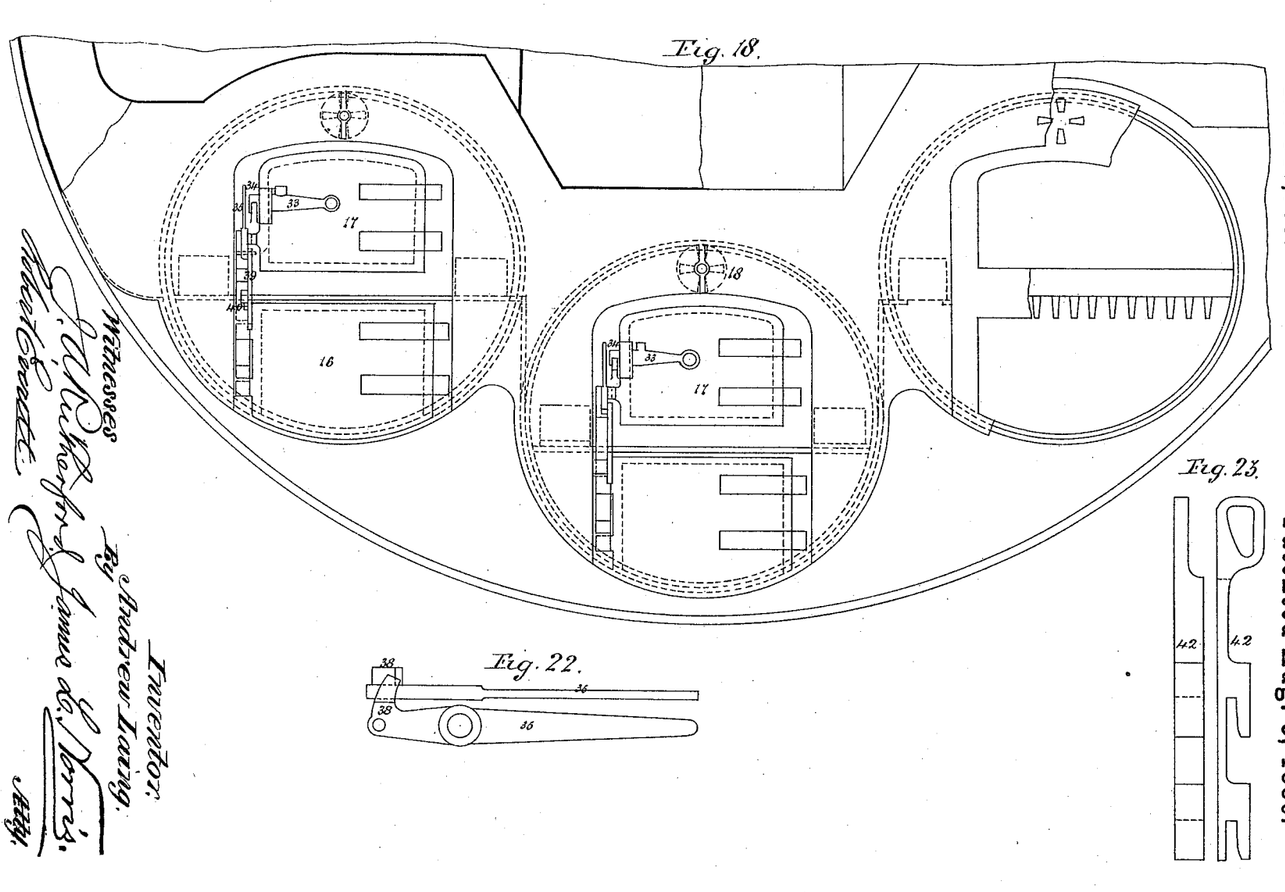
Figure 19:
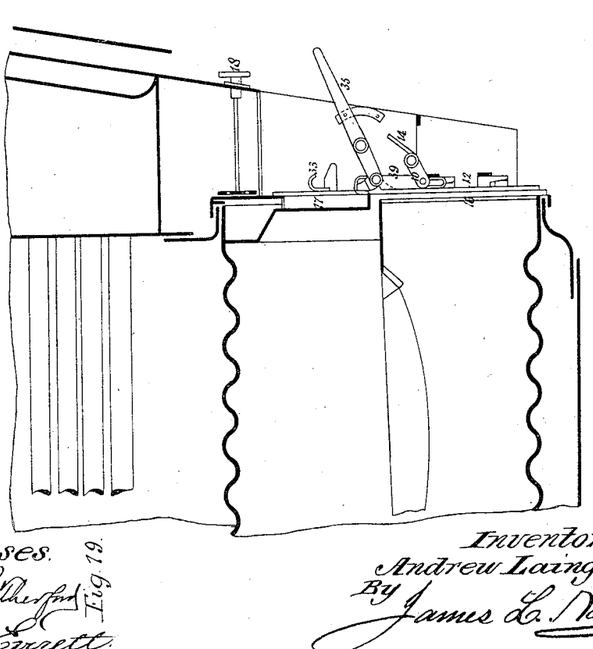

Figs. 18 and 19 show to an enlarged scale details of the doors and their fastenings. On the fire-door 17 is the ordinary latch, 33, and keeper, 34. On a pivot on the boiler-front is mounted a lever, 35, (shown separately at Fig. 22,) one end of which is made with a lug, 38, that can press the door 17 close home. Jointed to the end of lever 35 is a link, 39, made with a slot in which a pin on an arm, 40, can slide. This arm is on a spindle to which are attached the doors 14. The link 39 is jointed to the bolt 42 of the ash-pit door, (shown separately at Fig. 23,) and its slot is so arranged that the doors 14 must be shut before the bolt 42 is lifted to admit of the ash-pit door 16 being opened, the escape of the heated air to the stoke-hole being thus prevented.

Figures 11, 15, 24:
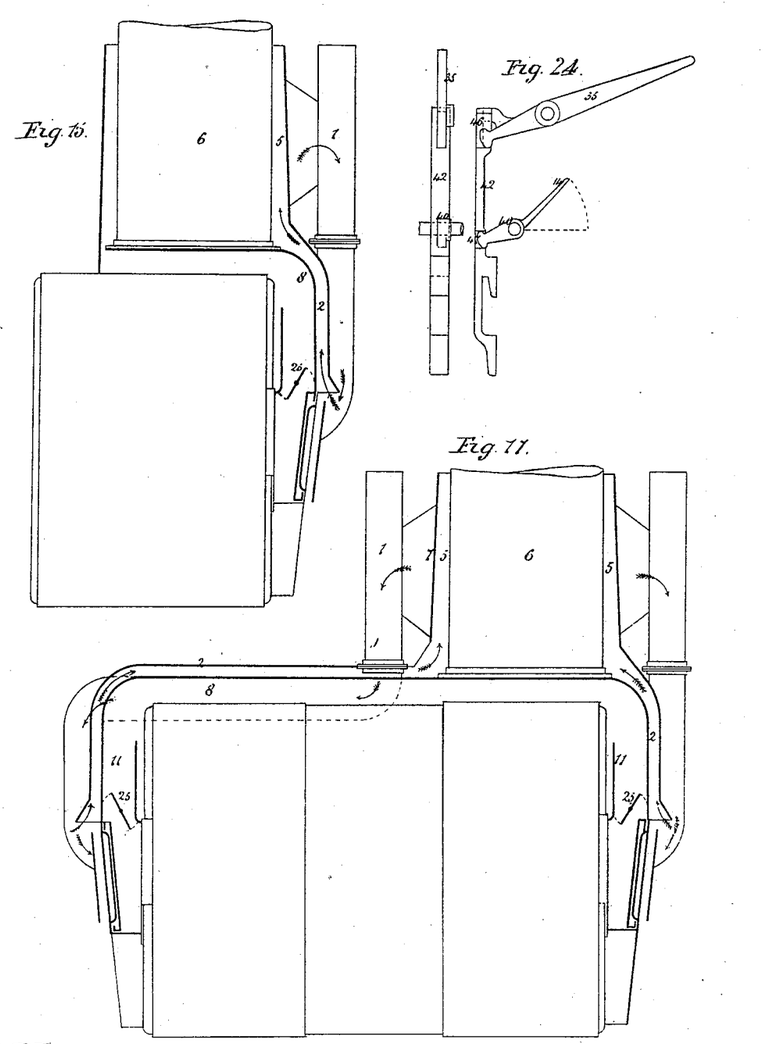

Fig. 24 shows a slightly modified arrangement of the ash-pit bolt 42, lever 35, and door 14. In this case the bolt 42 has a slot at its upper end, into which takes the head of the lever 35 for raising the same, and it has a lower slot, 47, into which takes the head of the arm 40 fixed on the spindle carrying the door 14. By this arrangement the door 14 is moved directly by the bolt 42 without the intervention of links.

Figure 20:
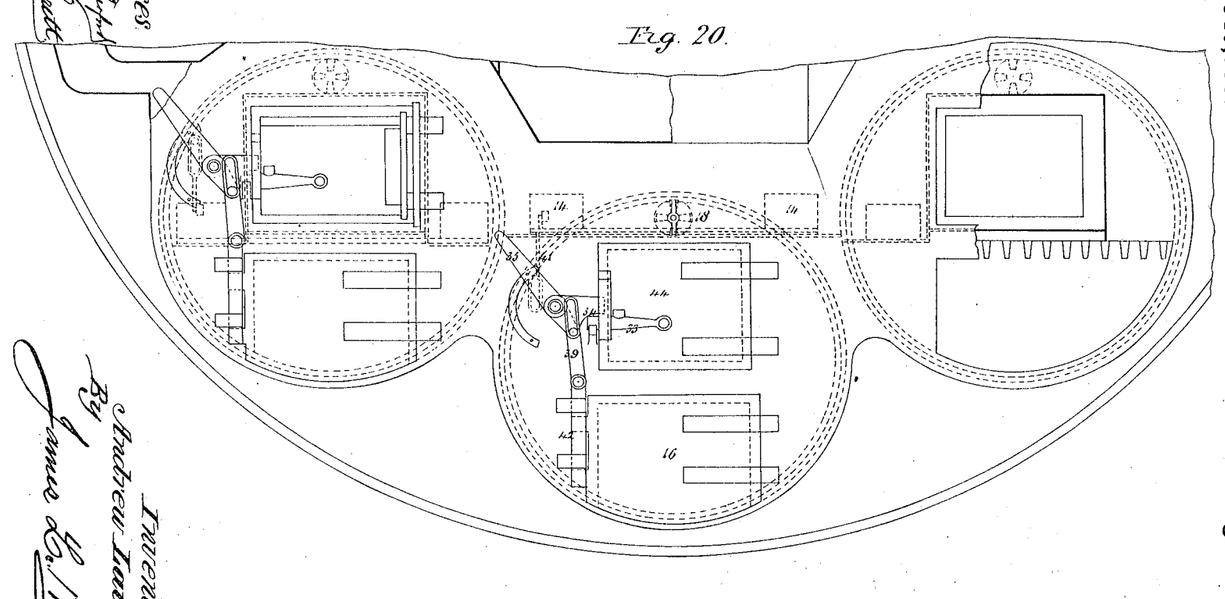
Figure 21:
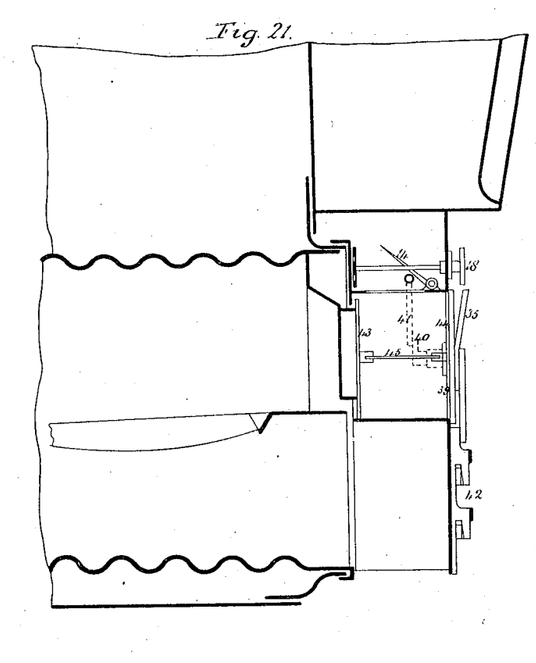

Figs. 20 and 21 show modifications of the door-connections. In this case there are two furnace-doors, 43 and 44, connected by a link, 45, so that both doors open and close together. The bolt 42 for the ash-pit door is, as before, hinged to the slotted link 39, and a pin on an arm, 40, moved by the lever 35, works in the slot of a rod, 41, which is linked to the doors 14. Thus on depressing the lever 35, the doors 14 are closed before the ash-pit bolt 42 is withdrawn.

I am aware that arrangements have been proposed for supplying boiler-furnaces with air driven by a fan along heated surfaces presented by the chimney, boilers, and their casings. I therefore make no general claim to the use of a fan for forcing the draft, nor to the arrangement of channels in such a manner that the air drawn or forced along them by the fan is more or less heated on its way to the furnaces.

Having thus described the nature of my invention, and the best means I know for carrying the same into practical effect, I claim—

1. In apparatus for ventilating stoke-holes and heating air-supply to boiler-furnaces, the combination of a fan or other ventilating-machine, with suction-channels opening from the stoke-holes and formed as casings to the smoke-boxes and uptakes, with or without heating-channels formed in the chimney-casing and in the uptake, and with an air-space surrounding the furnace fronts and communicating with the furnaces by openings governed by adjustable valves, substantially as herein described and illustrated by the accompanying drawings.

2. The combination, in an apparatus for ventilating stoke-holes and heating the air-supply to boiler-furnaces, of the ash-pit door, the air-regulating door, and lever-connections between the end doors, whereby the air-regulating door must be closed before the ash-pit door can be opened, substantially as described.

In testimony whereof I have signed my name to this specification, in the presence of two subscribing witnesses, this 6th day of April, A. D. 1886.

ANDREW LAING.

Witnesses:
ALEXR. T. BROWN,
ARCHIBALD MILLER.